US 6,589,908 B1

(12) United States Patent
Ginestra et al.

(10) Patent No.: US 6,589,908 B1
(45) Date of Patent: Jul. 8, 2003

(54) METHOD OF MAKING ALUMINA HAVING BIMODAL PORE STRUCTURE, AND CATALYSTS MADE THEREFROM

(75) Inventors: Josiane M. Ginestra, Richmond, TX (US); Russell C. Ackerman, Vale Houston, TX (US); Christian G. Michel, Ossining, NY (US)

(73) Assignee: Shell Oil Company, Houston, TX (US)

( * ) Notice: Subject to any disclaimer, the term of this patent is extended or adjusted under 35 U.S.C. 154(b) by 57 days.

(21) Appl. No.: 09/724,072

(22) Filed: Nov. 28, 2000

(51) Int. Cl.⁷ ............................. B01J 23/00; B01J 23/40; B01J 23/42; B01J 23/56; B01J 23/44
(52) U.S. Cl. ........................ 502/323; 502/320; 502/322; 502/327; 502/332; 502/333; 502/334; 502/335; 502/336; 502/355; 502/415; 502/439; 423/625; 423/626; 423/628; 423/629
(58) Field of Search ............................. 502/320, 322, 502/323, 327, 332, 333, 334, 335, 336, 337, 338, 339, 414, 415, 355, 439; 423/625, 626, 628, 629

(56) References Cited

U.S. PATENT DOCUMENTS

| | | | |
|---|---|---|---|
| 2,838,444 A | 6/1958 | Teter et al. ............. 196/50 |
| 2,935,463 A | 5/1960 | Secor et al. ............. 208/120 |
| 2,973,329 A | 2/1961 | Koch, Jr. ................ 252/463 |
| 3,032,514 A | 5/1962 | Malley et al. ........... 252/465 |
| 3,058,907 A | 10/1962 | Van Nordstrand et al. .. 208/138 |
| 3,124,418 A | 3/1964 | Malley et al. ............ 23/143 |
| 3,152,865 A | 10/1964 | Koch, Jr. ................ 23/143 |
| 3,232,887 A | 2/1966 | Pessimisis .............. 252/435 |
| 3,287,280 A | 11/1966 | Colgan et al. ........... 252/435 |
| 3,297,588 A | 1/1967 | Kehl et al. .............. 252/432 |
| 3,328,122 A | 6/1967 | Kehl et al. .............. 23/143 |
| 3,493,493 A | 2/1970 | Henke et al. ............ 208/264 |
| 3,623,837 A | 11/1971 | Kelly et al. ............. 23/143 |
| 3,749,664 A | 7/1973 | Mickelson et al. ....... 208/254 H |
| 3,778,365 A | 12/1973 | Hamner et al. .......... 208/111 |
| 3,897,365 A | 7/1975 | Feins et al. ............. 252/435 |
| 3,909,453 A | 9/1975 | O'Hara .................. 252/455 R |
| 3,983,197 A | 9/1976 | Mitsche ................. 264/56 |
| 3,994,832 A | 11/1976 | Antos ................... 252/464 |
| 4,014,985 A | * 3/1977 | Haleen et al. ........... 423/629 |
| 4,090,982 A | 5/1978 | Moser ................... 252/465 |
| 4,098,874 A | 7/1978 | Mitsche et al. .......... 423/628 |
| 4,154,812 A | 5/1979 | Sanchez et al. .......... 423/626 |
| 4,179,408 A | 12/1979 | Sanchez et al. .......... 252/448 |
| 4,248,852 A | 2/1981 | Wakabayashi et al. ..... 423/626 |
| 4,255,282 A | 3/1981 | Simpson ................ 252/435 |
| 4,301,037 A | 11/1981 | Sanchez et al. .......... 252/462 |
| 4,305,811 A | 12/1981 | Johnson ................. 208/139 |
| 4,328,130 A | 5/1982 | Kyan .................... 252/477 R |
| 4,357,263 A | 11/1982 | Heck et al. .............. 252/439 |
| 4,371,513 A | * 2/1983 | Sanchez et al. .......... 423/625 |
| 4,390,456 A | * 6/1983 | Sanchez et al. .......... 252/448 |
| 4,395,329 A | 7/1983 | LePage et al. ........... 208/251 H |
| 4,402,865 A | 9/1983 | Blakely ................. 252/432 |
| 4,422,960 A | 12/1983 | Shiroto et al. .......... 502/206 |
| 4,444,905 A | 4/1984 | Pessimis ................ 502/211 |
| 4,447,556 A | 5/1984 | O'Hara et al. ........... 502/74 |
| 4,460,707 A | 7/1984 | Simpson ................ 502/315 |
| 4,483,942 A | 11/1984 | Sekido et al. ........... 502/255 |
| 4,508,841 A | 4/1985 | Onuma et al. ........... 502/73 |

(List continued on next page.)

Primary Examiner—Stanley S. Silverman
Assistant Examiner—Cam N. Nguyen

(57) ABSTRACT

A method for making alumina having a pore structure characterized by the absence of macropores, no more than 5% of the total pore volume in pores greater than 350 Å, a high pore volume (greater than 0.8 cc/g measured by mercury intrusion) and a bi-modal pore volume distribution character, where the two modes are separated by 10 to 200 Å, and the primary pore mode is larger than the median pore diameter (MPD), calculated either by volume or by surface area, the MPD by volume being itself larger than the MPD by surface area. Alumina made by such process and catalyst made therefrom.

31 Claims, 9 Drawing Sheets

Isothermal precipitation at 43 deg C

U.S. PATENT DOCUMENTS

| | | | |
|---|---|---|---|
| 4,511,542 A | * 4/1985 | Anjier et al. | 423/127 |
| 4,530,911 A | 7/1985 | Ryan et al. | 502/74 |
| 4,555,394 A | 11/1985 | Asoaka et al. | 423/626 |
| 4,562,059 A | 12/1985 | Asoaka et al. | 423/626 |
| 4,574,001 A | * 3/1986 | Biefeldt et al. | 23/301 |
| 4,588,706 A | 5/1986 | Kukes et al. | 502/211 |
| 4,591,429 A | 5/1986 | Ho et al. | 208/254 H |
| 4,595,581 A | * 6/1986 | Misra et al. | 423/625 |
| 4,595,672 A | 6/1986 | Ho et al. | 502/219 |
| H189 H | * 1/1987 | Bauer | 423/111 |
| 4,652,545 A | 3/1987 | Lindsley et al. | 502/255 |
| 4,673,664 A | 6/1987 | Bambrick | 502/439 |
| 4,677,085 A | 6/1987 | Nevitt | 502/26 |
| 4,732,886 A | 3/1988 | Tomino et al. | 502/314 |
| 4,797,196 A | 1/1989 | Kukes et al. | 208/59 |
| 4,861,746 A | 8/1989 | Oishi et al. | 502/314 |
| 4,866,594 A | 12/1989 | Miller | 208/210 |
| 5,002,919 A | 3/1991 | Yamazaki et al. | 502/315 |
| 5,047,379 A | 9/1991 | Alyea et al. | 502/79 |
| 5,087,596 A | 2/1992 | Clark et al. | 502/49 |
| 5,094,993 A | 3/1992 | Miura et al. | 502/255 |
| 5,149,520 A | * 9/1992 | Sucech et al. | 423/625 |
| 5,163,973 A | * 11/1992 | Ellis | 23/301 |
| 5,178,849 A | * 1/1993 | Bauer | 423/626 |
| 5,186,818 A | 2/1993 | Daage et al. | 208/254 H |
| 5,194,243 A | * 3/1993 | Pearson et al. | 423/625 |
| 5,200,381 A | 4/1993 | Kamo | 502/170 |
| 5,232,888 A | 8/1993 | Kamo | 502/170 |
| 5,246,569 A | 9/1993 | Heinerman et al. | 208/216 R |
| 5,248,412 A | 9/1993 | Fujikawa et al. | 208/216 R |
| 5,482,910 A | 1/1996 | Bricker et al. | 502/300 |
| 5,507,940 A | 4/1996 | Ryan | 208/254 H |
| 5,529,761 A | * 6/1996 | Brown et al. | 423/121 |
| 5,545,602 A | 8/1996 | Nelson et al. | 502/314 |
| 5,800,797 A | 9/1998 | Matsumoto et al. | 423/625 |
| 5,972,820 A | 10/1999 | Kharas et al. | 501/127 |
| 6,015,485 A | 1/2000 | Shukis et al. | 208/112 |

* cited by examiner

Isothermal precipitation at 43 deg C

Isothermal precipitation at 48 deg C

Isothermal precipitation at 62 deg C

Isothermal precipitation at 80 deg C

Typical pore size distribution achievable with this invention

Larger primary mode (from high second temperature) with small separation between primary and secondary mode (from low first temperature) and moderate contribution of secondary mode (from higher % of alumina precipitated during the first step).

Lower primary mode with small separation between primary and secondary mode (from low first temperature) and very small contribution of secondary mode (from higher % of alumina precipitated during the first step).

Larger separation between primary and secondary mode from higher temperatures

Catalyst Performance in a Tar Sand Derived Heavy Gas Oil Accelerated Aging Test

First 150 Hours at 375 deg C, reminder of test at 400 deg C

METHOD OF MAKING ALUMINA HAVING BIMODAL PORE STRUCTURE, AND CATALYSTS MADE THEREFROM

FIELD OF THE INVENTION

This invention relates to alumina having a pore structure. This invention further relates to catalysts made from this alumina, from which catalysts may be specifically formulated to provide improved performance characteristics for a great number of hydrocarbon processing operations. This invention also relates to methods of producing this alumina.

BACKGROUND OF THE INVENTION

The art relating to alumina-containing supports, impregnating such supports with various catalytically active metals, metal compounds and/or promoters, and various uses of such impregnated supports as catalysts, is extensive and relatively well developed. As a few of the many exemplary disclosures relating to these fields may be mentioned the following U.S. patents, all of which are incorporated herein by reference for all purposes as if fully set forth U.S. Pat. Nos. 2,838,444; 2,935,463; 2,973,329; 3,032,514; 3,058,907; 3,124,418; 3,152,865; 3,232,887; 3,287,280; 3,297,588; 3,328,122; 3,493,493; 3,623,837; 3,749,664; 3,778,365; 3,897,365; 3,909,453; 3,983,197; 4,090,874; 4,090,982; 4,154,812; 4,179,408; 4,255,282; 4,328,130; 4,357,263; 4,402,865; 4,444,905; 4,447,556; 4,460,707; 4,530,911; 4,588,706; 4,591,429; 4,595,672; 4,652,545; 4,673,664; 4,677,085; 4,732,886; 4,797,196; 4,861,746; 5,002,919; 5,186,818; 5,232,888; 5,246,569; 5,248,412 and 6,015,485.

While the prior art shows a continuous modification and refinement of such catalysts to improve their catalytic activity, and while in some cases highly desirable activities have actually been achieved, there is a continuing need in the industry for even higher activity catalysts, which are provided by the present invention.

Much of the effort to develop higher activity catalysts has been directed toward developing supports that enhance the catalytic activity of metals that have been deposited thereon. In an overwhelming majority of applications the material chosen for a support is alumina, most often γ-alumina, but silica-alumina composites, zeolites and various other inorganic oxides and composites thereof have been and are employed as support materials. In the case of alumina, various researchers have developed methods for preparing supports having various surface areas, pore volumes and pore size distributions that, when appropriate metals are applied, are particularly suited for catalyzing a desired reaction on a particular feedstock, whether that reaction be directed toward hydrodesulphurization, hydrodemetallation, hydrocracking, reforming, isomerization and the like.

Many methods have thus far been proposed for the preparation of alumina. One such method includes aging an aqueous slurry containing seed aluminum hydroxide at a pH of 6–11 for the growth of the seed crystals by coalescence. This method requires a long period of time to obtain hydrogel particles of a large size.

U.S. Pat. Nos. 4,248,852 and 4,422,960 disclose a method for the preparation of alumina suitably used as catalyst carrier, wherein first and second pH controlling agents are alternately and repeatedly mixed with an aqueous slurry containing seed aluminum hydroxide to swing the pH of the slurry between hydrogel dissolution and precipitation regions. At least one of the first and second pH controlling agents includes an aluminum compound capable of forming an alumina hydrogel. Since aluminum hydroxide is continually replenished during the hydrogel growing step, the rate at which the seed aluminum hydroxide grows in size is much higher than that in the method in which the growth of the seed particles is effected by mere coalescence of the seed particles. However, this method has been found to involve a problem in that the resulting alumina carrier does not have entirely satisfactory chemical and physical stability.

U.S. Pat. Nos. 4,562,059 and 4,555,394 disclose a two-stage method for the preparation of alumina suitably used as catalyst carrier, wherein an alumina hydrogel is formed from non-crystalline seed aluminum hydroxide in a first stage and the resultant alumina hydrogel is processed for conversion into alumina in a second stage. The alumina produced by this method is characterized as having the greater part of its pore volume contained within a narrow range of pore diameters; i.e., the alumina manifests a sharp, unimodal pore volume distribution.

SUMMARY OF THE INVENTION

In accordance with the present invention, there is provided, in one aspect, an alumina having a novel pore structure. This novel pore structure is characterized by having no more than 5% of the total pore volume in pores greater than 350 Å ("macropores"), a high pore volume (greater than 0.8 cc/g measured by mercury intrusion) and a bi-modal pore volume distribution character; i.e., a pore volume distribution in which, when incremental pore volume is plotted as a function of pore diameter, the resulting function exhibits two maxima (also referred to as "peaks" or "modes" herein). These two modes are characterized in that one mode, herein defined as the "primary mode", exhibits a higher maximum than the other mode, which is herein defined as the "secondary mode". The primary and secondary modes are separated by at least about 10 Å and by as much as about 200 Å. The primary pore mode occurs at a pore diameter greater than the median pore diameter ("MPD"), calculated either by volume or by surface area. Median pore diameter calculated by volume ("$MPD_V$") herein means the pore diameter above which half of the total pore volume exists; median pore volume calculated by surface area ("$MPD_{SA}$") means that pore diameter above which half of the total pore surface area exists. In the alumina of the present invention, the $MPD_V$ is larger than the $MPD_{SA}$.

Also provided in this invention is a method of making such alumina. This method involves process steps that are similar to those taught in an earlier patent (U.S. Pat. No. 4,555,394). In the present invention, however, the seeds produced in the first stage need not be non-crystalline, no limits on the addition rates of aluminum components to the second stage are imposed and the alumina produced exhibits novel pore size distribution patterns. Indeed, by appropriate adjustment of the processing conditions used in the production of the alumina of the present invention, the final pore size distribution of the alumina support can be tailored to a specific catalytic application.

In another aspect, the present invention provides high activity catalysts comprising supports based upon the alumina of the present invention and impregnated with one or more metals.

These and other features and advantages of the present invention will be more readily understood by those of ordinary skill in the art from a reading of the following detailed description.

DETAILED DESCRIPTION OF THE INVENTION

The performance of hydrotreating catalysts is often affected by pore diffusion limitations. This is especially true with newer generations of catalysts, which offer a much higher intrinsic activity than older generations. With conventional alumina supports, efforts to reduce diffusion effects result either in loss of surface area or in reduction of the loading density through introduction of macropores, or both. This invention allows the achievement of higher catalyst effectiveness by minimizing the diffusion limitation effect, while preserving a high surface area. The alumina of the present invention exhibits a bimodal pore size distribution. Pore diameters for both the primary mode and the secondary mode can be tailored and the pore size distribution around these two modes is sharp, excluding pores in diameters outside the desired range. The performance improvement in catalysts produced from this alumina includes higher initial effectiveness as well as higher stability.

Figure 1:
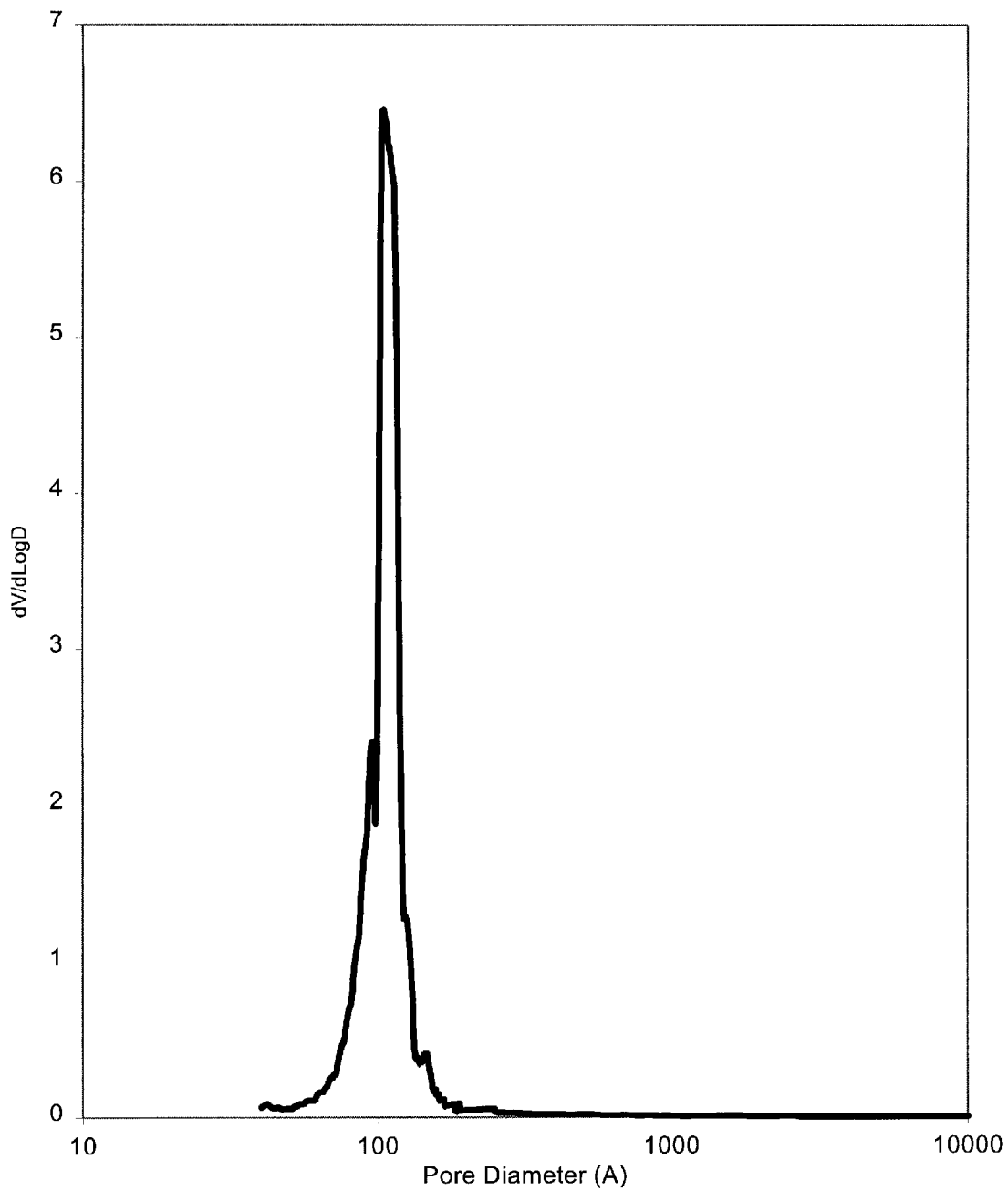
FIG. 1 shows the pore size distribution ("PSD") for a typical alumina not of this invention obtained with a single step isothermal precipitation process at 43° C.

Achieving such alumina extrudate properties is not possible with conventional alumina precipitation processes. When a single step precipitation is performed under isothermal conditions, low pore volume, unimodal, low median pore diameter alumina is produced if low precipitation temperatures are employed. Higher precipitation temperatures yield wider pore size distributions, with a "tail" of larger pores, which eventually (for high enough temperatures) leads to a significant percentage of macropores which cannot be eliminated with the mulling process, even if mulling conditions are severe. Examples of the pore structures of alumina produced by a single stage precipitation process at various temperatures are shown in FIG. 1. The effect of the precipitation temperature on alumina extrudate properties is easily seen. At low precipitation temperature, the alumina exhibits a unimodal pore size distribution having low total pore volume. As precipitation temperature is increased, the resulting alumina extrudate exhibits a widening range of pore sizes, with the percentage of macropores increasing with increasing precipitation temperature. Even if the temperature were increased gradually during precipitation, the resulting alumina will exhibit a relatively low pore volume, although the widening of its pore size distribution would be somewhat retarded.

Method of Making Alumina

The alumina of the present invention is made by a two-step precipitation process. Seeds are formed under well defined temperature, pH and flow rate conditions. The temperature of the seed slurry is then increased to a higher level. Precipitation is resumed at this higher temperature, again under well defined temperature, pH and flow rate conditions. The low temperature seed forming step insures a sharply defined pore size distribution, while the high temperature precipitation step generates high pore volume and controls the diameter of the primary mode.

In the first step, seed alumina is produced by precipitation from an aqueous solution of reagents conducted at between about 25° C. and about 60° C., preferably between about 35° C. and about 50° C. While a combination of aluminum sulfate and sodium aluminate reagents are preferred, any combination of reagents that results in the precipitation of alumina hydrogel or aluminum hydrate may be used. Suitable combinations of reagents include, but are not limited to, aluminum nitrate, aluminum chloride, or even an acid in combination with sodium aluminate, or sodium hydroxide in combination with an aluminum acid salt. The temperature of the first precipitation step depends on the characteristics desired in the final alumina product. Lower temperatures produce more smaller particles and result in the primary and secondary modes of the final alumina product being closer together and, consequently, a narrower pore size distribution. For this first precipitation step, the solution pH should be held between about 3 and 10, preferably between either 3.0 to 4.5 or 7.5 to 10.0, and most preferably between either 3.5 to 4.0 or 8.5 to 9.0. The amount of seeds precipitated at this low temperature first precipitation step, expressed as a percentage of the final alumina product, influences the magnitude and pore diameter of the secondary mode; i.e., increasing this percentage decreases the pore volume in the diameter range around the secondary mode and decreases the separation between the primary and secondary modes.

The seeds produced in the first precipitation step are then transferred to a second vessel where a second precipitation (herein sometimes referred to as a "strike") is effected. Slurry temperature for the second precipitation should be between about 50° C. and about 90° C. The preferred temperature for the second precipitation depends upon the desired extrudate mode, which increases with increasing strike temperature. In the second precipitation step the pH of the slurry should be maintained between about 7 and about 11, with a preferred range of 8.5 to 9.5. No limitation on the rate of addition of reagents to the strike have been found, although it is expected that at very high reagent addition rates, above a ratio of about 20 mols of contained aluminum per hour per mol of aluminum in the seeds, the total pore volume of the final alumina will decrease to an unsatisfactory level.

Both of these steps can be performed in a batch manner, or in a continuous manner or using a combination of batch and continuous systems. Alternatively, rather than transferring the seeds to a second vessel, the seeds may be left in the first vessel while its temperature is raised to the desired second step precipitation temperature prior to adding reagents. It is not necessary that either of these steps be performed under isothermal conditions, even though isothermal conditions are preferred. In all cases temperature control can be achieved through the use of a cooling or heating jacket, proper control of the reagent temperature or addition of cold water to the alumina slurry throughout the precipitation process.

The strike slurry product is then washed to remove contaminants in two stages. Residual sulfate is removed at a pH over about 9, preferably about 10; residual sodium is removed at a pH in the range of 7.0 to 9.5, with a preferred range of 8.0 to 8.5, so as to fine tune control of the alumina extrudate pore size distribution. Either sulfate or sodium residue may be removed first. The addition of sodium hydroxide or sodium aluminate is preferred to raise the slurry pH while nitric acid is preferred to reduce slurry pH, but any acidic reagent may be used, including, but not limited to, acetic acid and $CO_2$. Extrudate pore volume decreases and pore size distribution becomes narrower as slurry pH is decreased. The alumina can then be partially dried and extruded, or converted to a powder which is subsequently mulled and extruded. The wet extrudate is dried and calcined in a ways well known to those skilled in the art.

Characterization of the Alumina of the Present Invention

The alumina of the present invention has a novel pore structure. This novel pore structure is characterized by having no more than 5% of the total pore volume in pores greater than 350 Å ("macropores"), a high pore volume (greater than 0.8 cc/g measured by mercury intrusion) and a bi-modal pore volume distribution character; i.e., a pore volume distribution in which, when incremental pore volume is plotted as a function of pore diameter, the resulting function exhibits two maxima. These two modes are characterized in that the primary mode exhibits a higher maximum than the secondary mode. The primary and secondary modes are separated by at least about 10 Å and by as much as about 200 Å, preferably between 20 Å and 80 Å. The primary pore mode occurs at a pore diameter greater than the median pore diameter ("MPD"), calculated either by volume or by surface area. In the alumina of the present invention, the $MPD_V$ is larger than the $MPD_{SA}$.

Examples of the pore size distribution are shown in FIGS. 5 through 8.

Catalysts Using Alumina of the Present Invention

The present invention is applicable to any γ-alumina supported catalyst and is particularly applicable to those used in applications where the apparent rate of reaction is at least partially diffusion limited. Catalysts impregnated with one or more of a wide variety of catalytically active metals well-known to those of ordinary skill in the art as exemplified, for example, by the numerous incorporated references benefit from the use of the alumina of the present invention. In the context of the present invention, "catalytically active metals" includes both the metals themselves as well as metal compounds. In addition to the catalytically active metals, the catalysts may also be impregnated with one or more well-known promoters such as phosphorous, tin, silica and titanium (including compounds thereof).

Typically, the catalytically active metals are transition metals selected from the group consisting of Group VIB metals, Group VIII metals and combinations thereof. The specific choice of metal(s), promoter(s) and loadings, of course, depends upon the desired end use of the catalyst, and these variables can readily be adjusted by those of ordinary skill in the art based upon the end use. As specific examples thereof may be mentioned the following (wt % is based on the total catalyst weight):

Hydrotreating Operations

Hydrodenitrogenation Ni and/or Co, and preferably Ni, in an amount up to 7 wt % calculated as NiO and/or CoO
 Mo and/or W, preferably Mo, in an amount up to 35 wt. % calculated as $MoO_3$ and/or $WO_3$
 optionally P, and preferably including P, in an amount up to 10 wt % calculated as $P_2O_5$
Hydrodesulfurization Ni and/or Co, and preferably Co, in an amount up to 9 wt % calculated as NiO and/or CoO
 Mo and/or W, preferably Mo, in an amount up to 35 wt % calculated as $MoO_3$ and/or $WO_3$
 optionally P, and preferably including P, in an amount up to 10 wt % calculated as $P_2O_5$
Hydrodemetallation optionally Ni and/or Co, and preferably including Ni and/or Co, in an amount up to 5 wt % calculated as NiO and/or CoO
 Mo and/or W, preferably Mo, in an amount up to 20 wt % calculated as $MoO_3$ and/or $WO_3$
 optionally P, and preferably including P, in an amount up to 10 wt % calculated as $P_2O_5$
Hydroconversion Ni and/or Co, and preferably Ni, in an amount up to 5 wt % calculated as NiO and/or CoO
 Mo and/or W, preferably Mo, in an amount up to 20 wt % calculated as $MoO_3$ and/or $WO_3$
 optionally P, and preferably including P, in an amount up to 6 wt % calculated as $P_2O_5$
Hydrocracking Ni and/or Co, and preferably Ni, in an amount up to 5 wt % calculated as NiO and/or CoO
 Mo and/or W, preferably Mo, in an amount up to 20 wt % calculated as $MoO_3$ and/or $WO_3$
 optionally P, and preferably including P, in an amount up to 10 wt % calculated as $P_2O_5$
Hydrogenation/ a noble metal, and preferably Pt or Pt in combination with
Dehydrogenation Rh, in an amount up to 2 wt % calculated on an elemental basis
Reforming a noble metal, and preferably Pt or Pt in combination with another noble metal such Re and/or Ir, and/or Sn, in an amount up to 2 wt % calculated on an elemental basis

Non-Hydrotreating Operations

Isomerization a noble metal, and preferably Pt or Pt in combination with another noble metal, in an amount up to 2 wt % calculated on an elemental basis
Claus Process Ni and/or Co, and preferably Ni, in an amount up to 5 wt % calculated as NiO and/or CoO
 Mo and/or W, preferably Mo, in an amount up to 20 wt % calculated as $MoO_3$ and/or $WO_3$
 optionally P, and preferably including P, in an amount up to 6 wt % calculated as $P_2O_5$ Such catalysts are prepared by impregnating the supports with the appropriate components, followed by various drying, sulfiding and/or calcining steps as required for the appropriate end use. Such catalyst preparation is generally well-known to those of ordinary skill in the relevant art, as exemplified by the numerous previously incorporated references, and further details may be had by reference thereto or numerous other general reference works available on the subject.

Catalysts Tailored to a Specific Operation

By appropriate adjustment of the processing conditions used in the production of the alumina of the present invention, the final pore size distribution of the alumina support can be tailored to a specific catalytic application. For example, a resid HDM catalyst would require a high pore volume, a high mode (around 200 Å) and a fairly sharp pore size distribution, which can be achieved with the alumina described in Example 2, the PSD for which is shown on FIG. 6. When calcined at 1600° F. (871° C.) for 2 hours, such extrudate had a pore mode of 204 Å. For an application where the catalyst is expected to perform well for both HDM and HDS activities, a pore structure similar to the one in Example 4, the PSD for which is shown on FIG. 8. would be preferred: the large pores (primary mode) would provide the necessary HDM activity, while the smaller pores (secondary mode) would provide the surface area necessary to achieve a high enough sulfur removal rate. A third type of example would include any application where the desired reaction is diffusion limited. A pore structure similar to Example 1, the PSD for which is shown on FIG. 5 would provide the necessary surface area via the secondary mode while minimizing diffusion limitation effect via the primary mode. The heavier the feed the larger the modes would need to be. In the case of a lighter feed such as diesel HDS, a smaller separation between the two modes would be sought, and the primary mode would be set in the range of 100–140 Å.

The pore structure of this invention is also beneficial to enhance catalyst stability incases where the predominant cause of deactivation is increased pore diffusion limitation. Hydrotreating of heavy gas oils, including tar sand derived gas oils, is an example of such a case.

EXAMPLES

The present invention as described above will be further exemplified by the following specific examples which are provided by way of illustration and not limitation thereof.

Example 1

This example describes the preparation of an alumina of the present invention to produce a hydrotreating catalyst with improved initial activity and stability for processing a gas oil derived from tar sand.

Figure 5:
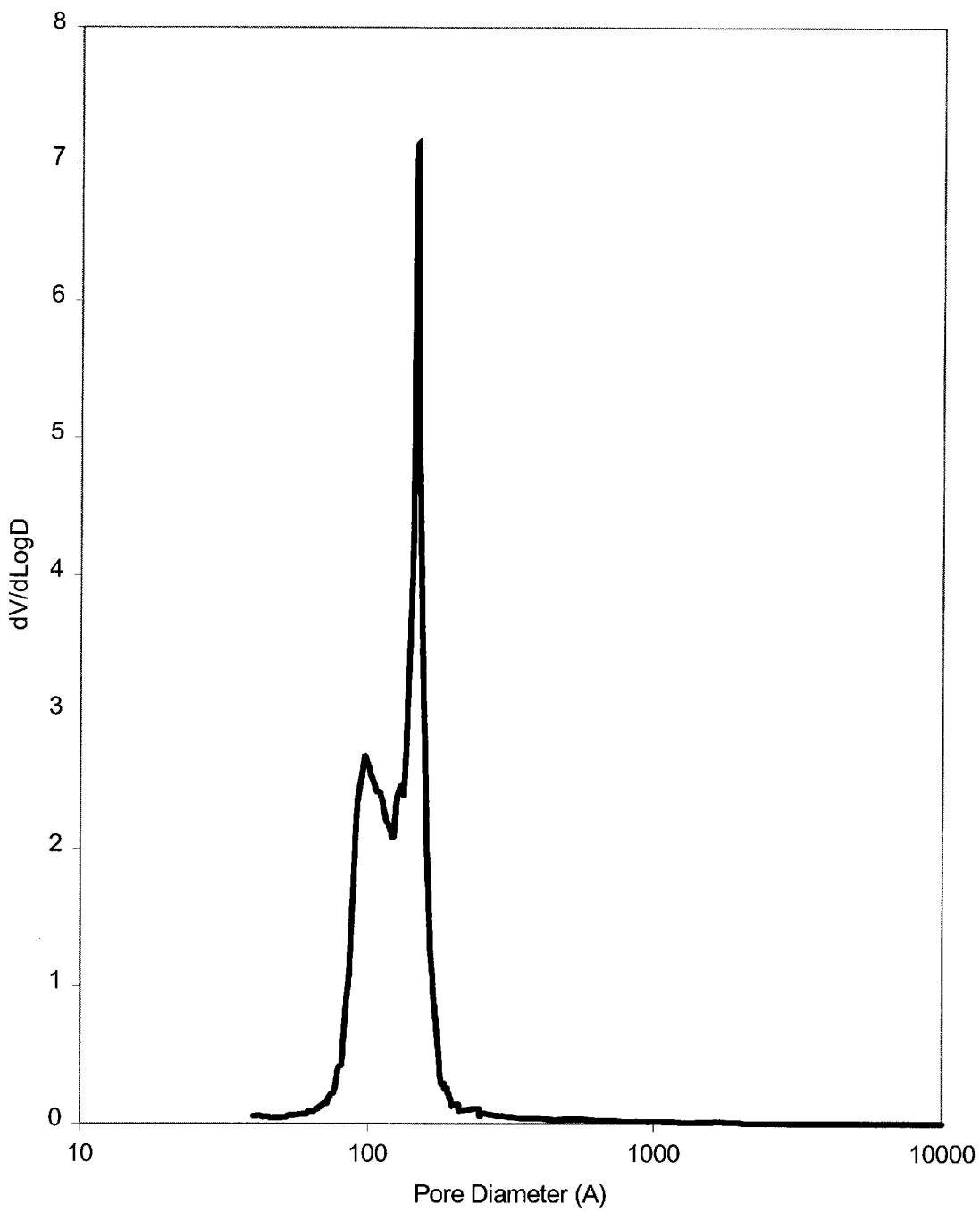
FIG. 5 shows the PSD for an alumina of the present invention obtained with a first precipitation at 41° C. followed by the remaining precipitation at 60° C.

200 kg of water and 5 kg of an aqueous solution of aluminum sulfate (8% contained $Al_2O_3$) were added to a stirred tank. The temperature was brought to 41° C. The same aluminum sulfate solution was then added continuously for 8 minutes at a rate of 1.4 kg/min, while pH was brought to 8.5 and maintained in the range of 8.3–9.0 by adding an aqueous solution of sodium aluminate (23.5% contained $Al_2O_3$), while maintaining the solution temperature at 41° C. by circulating cold water through the tank jacket. The temperature of the resulting slurry was then increased to 60° C., with stirring, but no addition of reagents. Reagent addition was resumed for about 50 minutes, while maintaining the temperature at 60° C. by circulating cold water through the tank jacket and maintaining pH in the range of 8.1 to 8.6. The resulting slurry contained about 6.3% $Al_2O_3$. About 14% of the total alumina had been formed during the first precipitation step. The alumina slurry was then filtered and washed, then spray dried. The powder was mulled with water, producing a mix containing 63% water, extruded, dried at 150° C., and calcined at 1100° F. (593° C.). Properties of the extrudate are shown in Table 1 and the pore size distribution is shown in FIG. 5. The extrudate was impregnated with a typical aqueous metal solution, to yield a catalyst containing 15.5% molybdenum, 3.6% nickel, 3.8% phosphorus. The impregnated catalyst was dried and calcined at 800° F. (427° C.). The properties of the alumina extrudate corresponding to this Example 1 were given in Table 1. The catalyst of Example 1 has a primary mode of 173 Å, a secondary mode of 103 Å, a total mercury pore volume of 0.496 cc/g, with only 0.75% of the pore volume in macropores (>350 Å), and a nitrogen surface area of 152 $m^2/g$. Comparatively, a sample of a well known commercial catalyst was found to have a primary mode of 121 Å, a secondary mode of 100 Å, a total mercury pore volume of 0.445 cc/g with only 1.0% of the pore volume in macropores (>350 Å) and a nitrogen surface area of 164 $m^2/g$. The metal content of this commercial catalyst was 13.0% molybdenum, 3.0% nickel and 3.2% phosphorus.

Example 2

Figure 6:
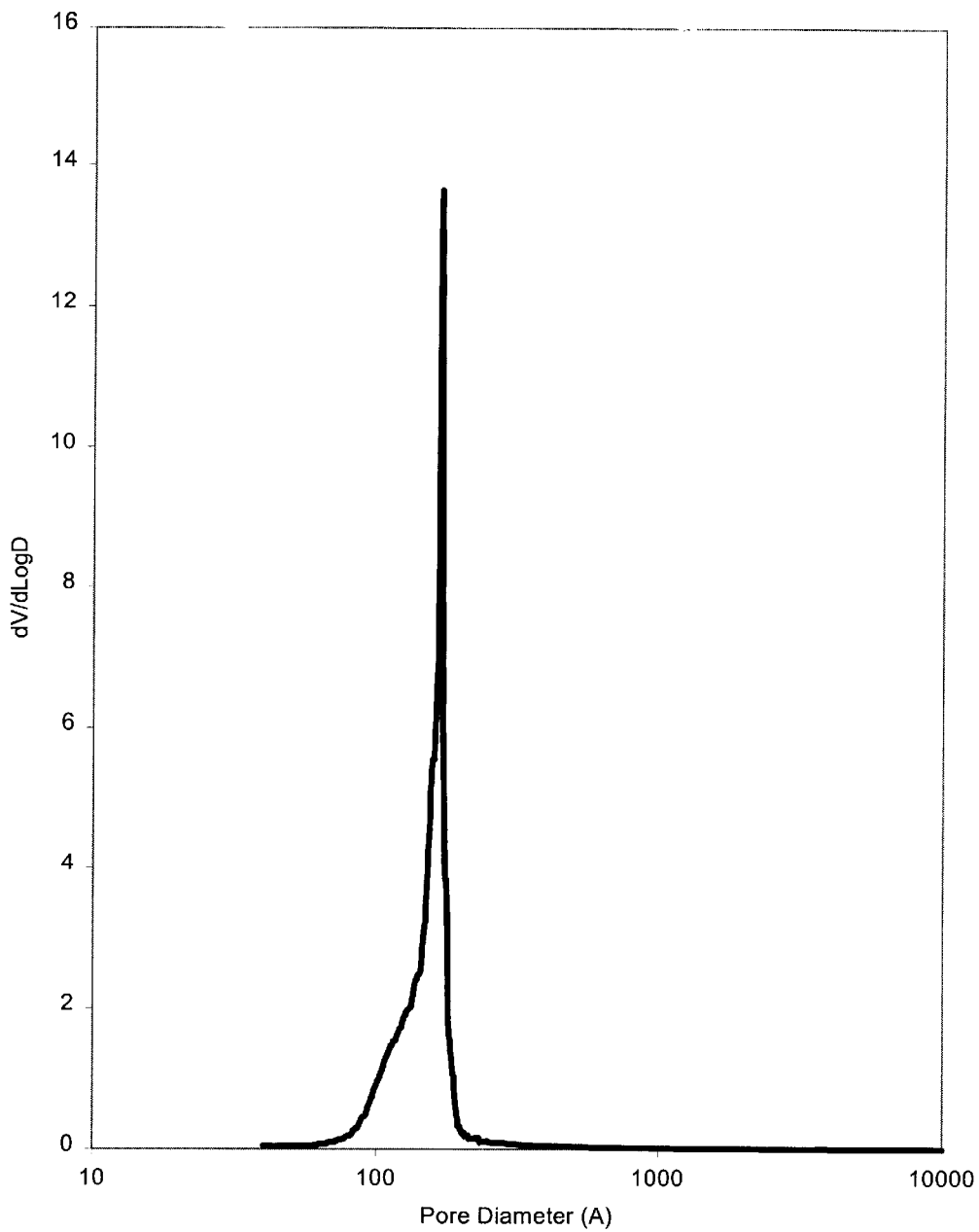
FIG. 6 shows the PSD for an alumina of the present invention obtained with a first precipitation at 33° C. followed by the remaining precipitation at 81° C.

This example describes the preparation of an alumina of the present invention wherein a high strike temperature was used to produce an extruded support having a high pore mode, particularly useful for producing catalysts for hydrodemetallation 200 kg of water and 5 kg of an aqueous solution of aluminum sulfate (8% contained $Al_2O_3$) were added to a stirred tank. The temperature was brought to 33° C. The same aluminum sulfate solution was then added continuously for 20 minutes at a rate of 1.4 kg/min, while pH was brought to 8.5 and maintained in the range of 8.3–8.6 by simultaneously adding an aqueous solution of sodium aluminate (23.5% contained $Al_2O_3$), while maintaining the temperature at 33° C. by circulating cold water through the tank jacket. The temperature of the resulting slurry was then increased to 81° C., with stirring, but no addition of reagents. Reagent addition was resumed for about 40 minutes, while maintaining the temperature at 81° C. by circulating cold water through the tank jacket and maintaining pH in the range of 8.2 to 9.2. The resulting slurry contained about 6.5% $Al_2O_3$. About 29% of the total alumina had been formed during the first precipitation step. The alumina slurry was then filtered and washed, then spray dried. The powder was mulled with water, producing a mix containing 63% water, extruded, dried at 150° C., and calcined at 1100° F. (593° C.) Details of the pore structure of the alumina extrudate disclosed in Example 2 were given in Table 1 and the pore size distribution is shown in FIG. 6. For an HDM application a calcination temperature higher than that used for the comparative examples in Table 1 would be preferred. When calcined at a still moderate temperature of 1600° F. (871° C.), the alumina extrudate of Example 2 has a primary pore mode of 204 Å, a total mercury pore volume of 0.95 cc/g with only 3.4% of the volume in macropores larger than 350 Å.

Example 3

This example describes the preparation of an alumina of the present invention to produce a hydrotreating catalyst with improved initial activity and stability for processing a tar sand derived gas oil. In this example a lower seed temperature is used and the amount of seeds is increased compared to Example 1, in order to obtain a sharper pore size distribution with a smaller separation between the primary and secondary modes. Such catalyst pore structure is an alternative choice to the one presented in Example 1.

200 kg of water and 5 kg of an aqueous solution of aluminum sulfate (8% contained $Al_2O_3$) were added to a stirred tank. The temperature was brought to 34° C. The same aluminum sulfate solution was then added continuously for 12 minutes at a rate of 1.4 kg/min, while pH was brought to 3.8 and maintained in the range of 3.7–4.1 by simultaneously adding an aqueous solution of sodium aluminate (23.5% contained $Al_2O_3$), while maintaining the temperature at 34° C. by injecting cold water in the slurry. The temperature of the resulting slurry was then increased to 61° C., with stirring, but no addition of reagents. Reagent addition was resumed for about 50 minutes, while maintaining the temperature below 61° C. by injecting cold water in the slurry and maintaining pH in the range of 8.2 to 8.5. The resulting slurry contained about 6.3% $Al_2O_3$. About 34% of the total alumina had been formed during the first precipitation step. The alumina slurry was then filtered and washed, then spray dried. The powder was mulled with water, producing a mix containing 65% water, extruded, dried at 150° C., and calcined at 1100° F. (593° C.) and at 900° F. (482° C.). The 900° F. (482° C.) extrudate was impregnated with a typical aqueous metal solution, to yield a catalyst containing 15.1% molybdenum, 3.5% nickel, 3.7% phosphorus. The impregnated catalyst was dried and calcined at 800° F.

Figure 7:
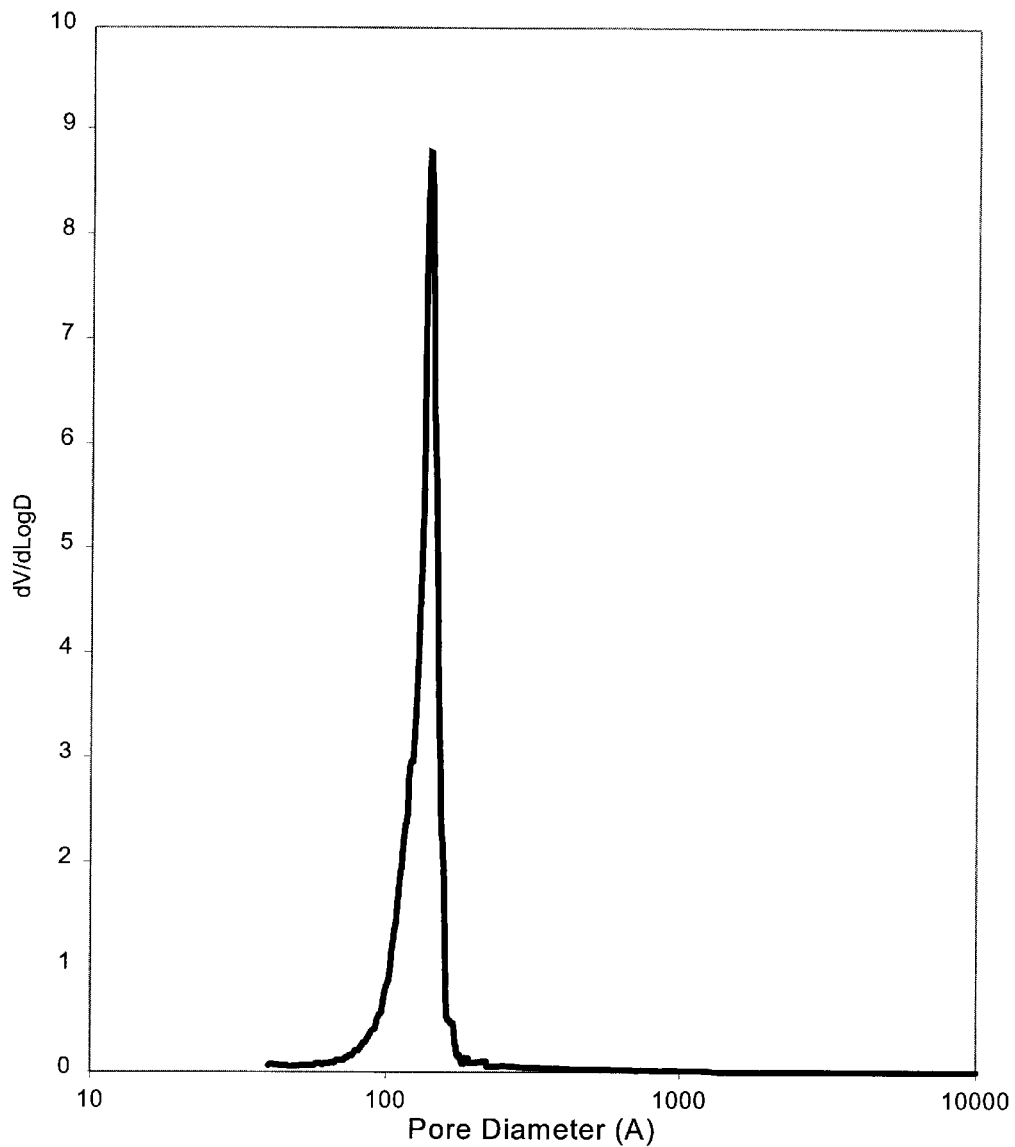
FIG. 7 shows the PSD for an alumina of the present invention obtained with a first precipitation at 34° C. followed by the remaining precipitation at 61° C.

The properties of the extrudate of Example 3 are given in Table 1 and its pore size distribution is shown in FIG. 7. For the chosen catalyst application, the alumina extrudate was calcined at a temperature of only 900° F., to yield a primary mode of 129 Å, a secondary mode of 115 Å and a surface area of 257 m²/g. The catalyst of Example 3 has a primary mode of 160 Å, a secondary mode of 130 Å, a total mercury pore volume of 0.470 cc/g, with only 0.9% of the pore volume in macropores (>350 Å), and a nitrogen surface area of 154 m²/g.

Example 4

This example describes the preparation of an alumina of the present invention wherein seeds were produced at low pH. The higher temperatures for both precipitation steps result in a higher separation of the two modes.

Figure 8:
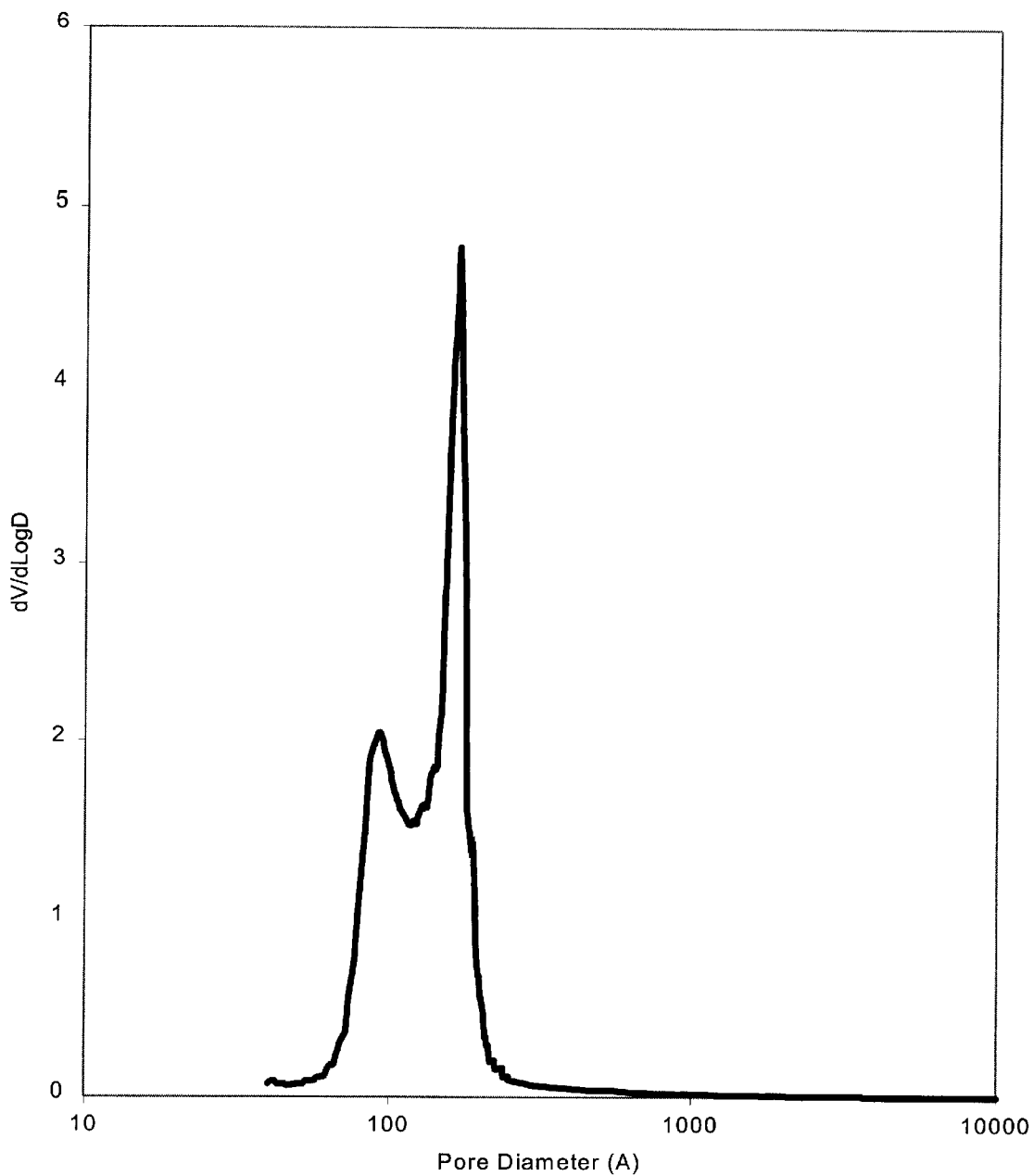
FIG. 8 shows the PSD for an alumina of the present invention obtained with a first precipitation at 45° C. followed by the remaining precipitation at 70° C.

200 kg of water and 5 kg of an aqueous solution of aluminum sulfate (8% contained $Al_2O_3$) were added to a stirred tank. The temperature was brought to 45° C. The same aluminum sulfate solution was then added continuously for 15 minutes at a rate of 1.4 kg/min, while pH was brought to 3.8 and maintained in the range of 3.8–4.2 by simultaneously adding an aqueous solution of sodium aluminate (23.5% contained $Al_2O_3$), while maintaining the temperature at 45° C. by circulating cold water through the tank jacket. The temperature of the resulting slurry was then increased to 70° C., with stirring, but no addition of reagents. Reagent addition was resumed for about 40 minutes, while maintaining the temperature at 60° C. by injecting cold water in the slurry and maintaining pH in the range of 8.2 to 9.1 (first bringing pH in that range). The resulting slurry contained about 5.6% $Al_2O_3$. About 26% of the total alumina had been formed during the first precipitation step. The alumina slurry was then filtered and washed, then spray dried. The powder was mulled with water, producing a mix containing 65% water, extruded, dried at 150° C., calcined at 1100° F. (593° C.). Properties of the extrudate are shown in Table 1 and the pore size distribution is shown in FIG. 8.

TABLE 1

Alumina Extrudate Pore Structures

| | Example | | | |
|---|---|---|---|---|
| | 1 | 2 | 3 | 4 |
| Hg Pore Volume (PV), cc/g | 0.91 | 0.95 | 0.84 | 0.94 |
| % of PV in pores of diameter > 350Å | 1.8 | 2.5 | 1.5 | 2.2 |
| Primary Mode, Å | 147 | 168 | 139 | 168 |
| Secondary Mode, Å | 100 | 120 | 115 | 93 |
| $MPD_{SA}$, Å | 116 | 153 | 131 | 113 |
| $MPD_V$, Å | 129 | 157 | 136 | 139 |
| Surface Area by $N_2$; m²/g | 242 | 227 | 222 | 258 |

Example 5 (Comparative)

This example compares the performance of two catalysts of the present invention against that of the commercial catalyst when used to catalyze the hydrodenitrogenation of a heavy gas oil, composed of straight run and coker gas oil, derived from tar sand.

Figure 9:
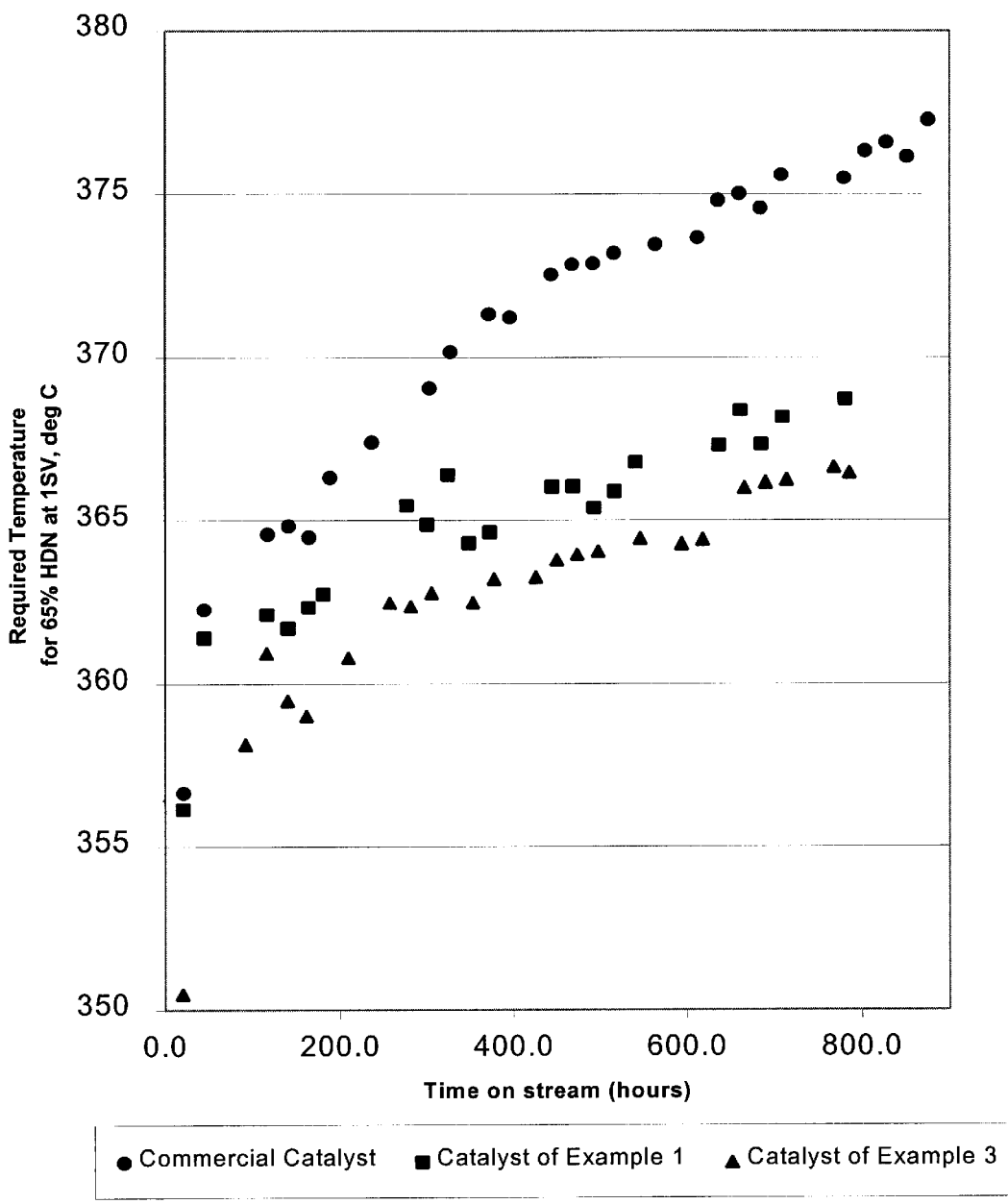
FIG. 9 shows the comparison of performance for two aluminas of the present invention compared to a commercial catalyst having a traditional pore structure, for hydrodenitrogenation of a tar sand derived heavy gas oil.

The properties of this feed are given in Table 2. A sample of the catalysts from Examples 1 and 3 and of a commercial HDN catalyst were used to treat such feed. Test conditions were a liquid hourly space velocity of 1 $hr^{-1}$ with reactor temperature for the first 150 hours of 375° C. followed by 400° C. for the remainder of the test. FIG. 9 shows the temperature required to achieve 65% HDN conversion.

The catalyst of Example 1 was found to have an initial performance advantage of 5° C. over the commercial catalyst, and an activity decline rate only 53% of that of the commercial catalyst. The catalyst of Example 3 was found to have an initial performance advantage of 6° C. over the commercial catalyst, and a activity decline rate only 59% of that of the commercial catalyst.

TABLE 2

Properties of Heavy Gas Oil Derived from Tar Sand

| | |
|---|---|
| Density, g/cc | 0.9895 |
| Sulfur, wt. % | 4.06 |
| Total Nitrogen, wt. % | 0.328 |
| Basic Nitrogen, wppm | 1088 |
| Nickel, wppm | 0.6 |
| Vanadium, wppm | 2.4 |
| MCR, wt. % | 2.1 |
| $C_5$ Asphaltenes, wt. % | 0.1 |
| Bromine Number | 21.6 |
| Aromatics, wt. % | |
| Mono | 6.51 |
| Di | 5.61 |
| Tri | 7.67 |
| Tetra | 8.03 |
| Total | 27.82 |
| Distillation, ° C. | |
| Initial | 218 |
| 5% | 277 |
| 10% | 302 |
| 20% | 337 |
| 30% | 365 |
| 40% | 389 |
| 50% | 413 |
| 60% | 435 |

TABLE 2-continued

Properties of Heavy Gas Oil Derived from Tar Sand

| | |
|---|---|
| 70% | 457 |
| 80% | 483 |
| 90% | 517 |
| 95% | 546 |
| Final | 631 |

Example 6 (Comparative)

This example describes the preparation of an alumina not of the present invention for a typical alumina obtained with a single step isothermal precipitation process.

In making this alumina, the same equipment, same geometry and mixing characteristics, same flow rates, same alumina slurry concentration was used as in the process of the present invention. The powder was mulled with water only (no peptizing agent), extruded, dried and calcined at 1100° F. (593° C.) according to the same protocol followed for evaluating the alumina powders of the present invention. In this particular case, the precipitation temperature is relatively cold (43° C.). The resulting extrudate exhibits a sharp, unimodal pore size distribution as shown in FIG. 1, but the total pore volume, measured by mercury intrusion, is low (only 0.73 cc/g).

Example 7 (Comparative)

This example describes the preparation of an alumina not of the present invention obtained with a single step isothermal precipitation process at a higher precipitation temperature.

Figure 2:
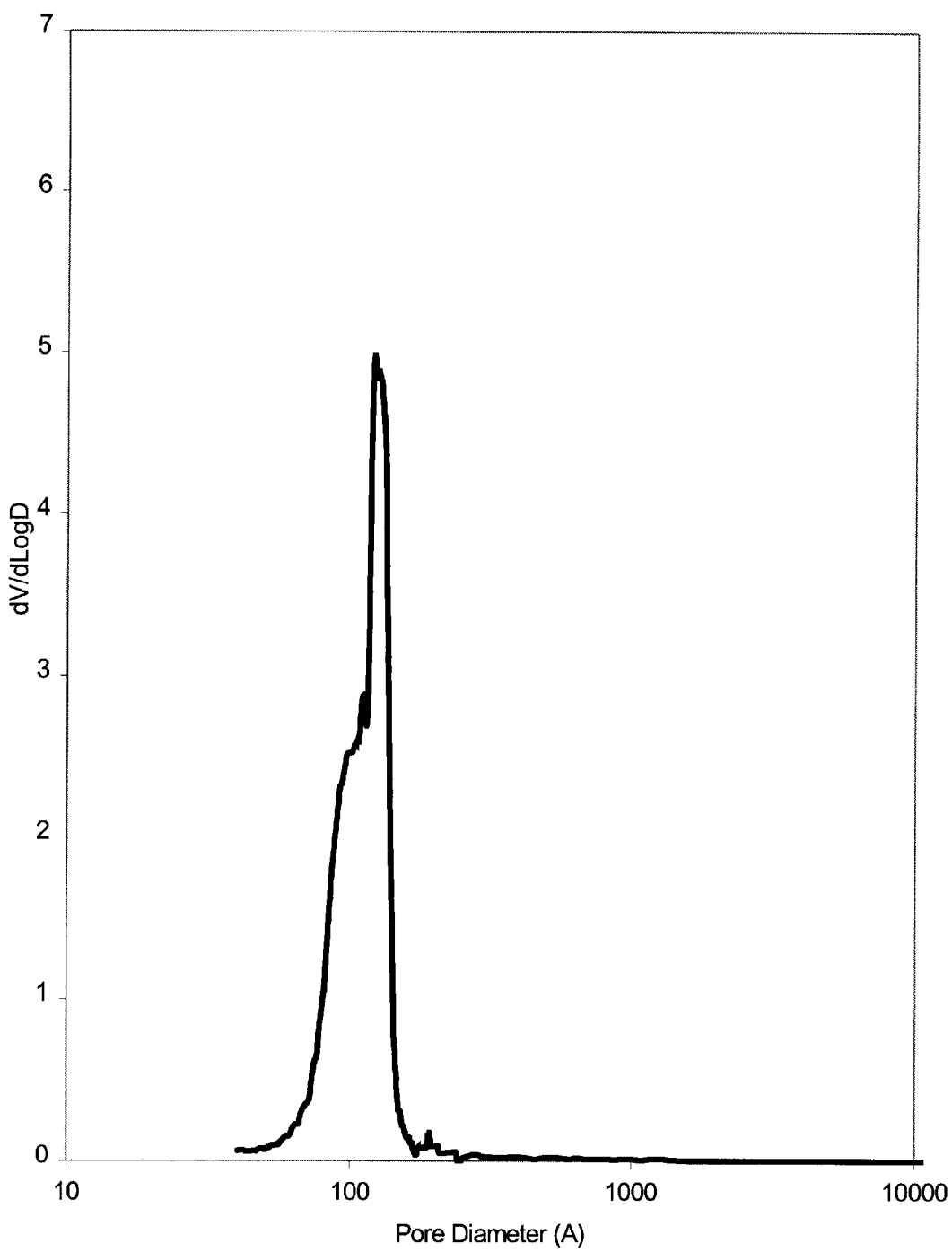
FIG. 2 shows the PSD for a typical alumina not of this invention obtained with a single step isothermal precipitation process at 48° C.

Alumina was prepared as in Example 6 except the precipitation temperature was 48° C. The resulting extrudate exhibited a higher total pore volume than that of Example 6 measured by mercury intrusion (0.82 cc/g), with a bimodal character similar to that of the alumina of this invention as shown in FIG. 2.

Example 8 (Comparative)

This example describes the preparation of an alumina not of the present invention obtained with a single step isothermal precipitation process at an even higher precipitation temperature.

Figure 3:
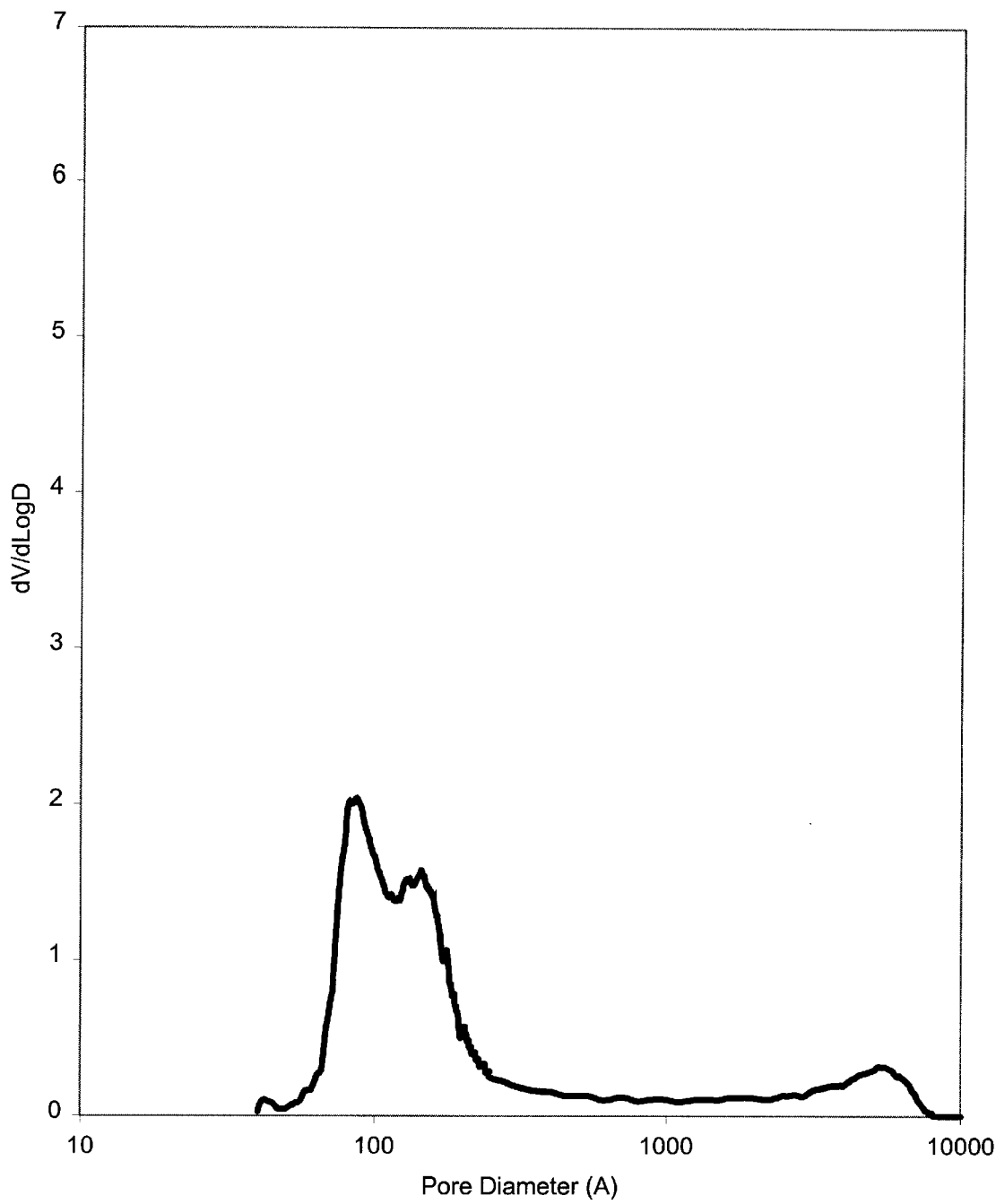
FIG. 3 shows the PSD for a typical alumina not of this invention obtained with a single step isothermal precipitation process at 62° C.

Alumina was prepared as in Example 6 except the precipitation temperature was 62° C. The resulting extrudate exhibited a higher total pore volume than that of Example 7 measured by mercury intrusion (0.95 cc/g), with a bimodal character similar to that of the alumina of this invention as shown in FIG. 3. However, macropores comprised 21% of the total pore volume and only 0.75 cc/g of pore volume was found in pores less than 350 Å. Note that the PSD showed a bi-modal character in the pore diameter range of interest (i.e., less than 350 Å), but the primary mode (highest peak) was the one corresponding to the lowest pore diameter.

Example 9 (Comparative)

This example describes the preparation of an alumina not of the present invention obtained with a single step isothermal precipitation process at a very high precipitation temperature.

Figure 4:
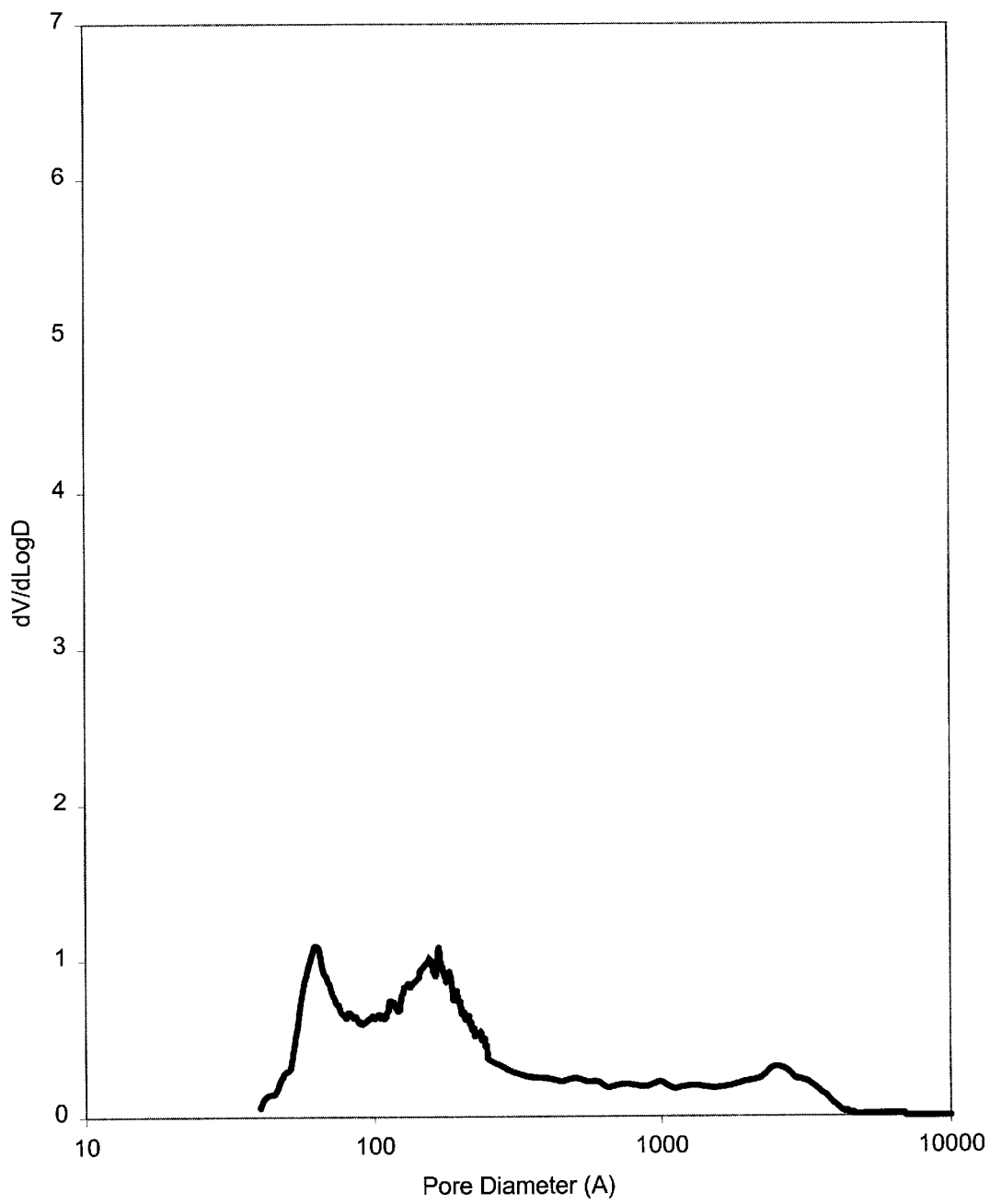
FIG. 4 shows the PSD for a typical alumina not of this invention obtained with a single step isothermal precipitation process at 80° C.

Alumina was prepared as in Example 6 except the precipitation temperature was 80° C. The PSD of the resulting alumina is shown in FIG. 4. The resulting extrudate exhibited a lower total pore volume than that of Example 8 measured by mercury intrusion (0.82 cc/g), with an even higher percentage (29%) of the pore volume contained in macropores (i.e., greater than 350 Å) and a very wide distribution of pore volume.

We claim:

1. A process for making a catalyst support comprising an alumina extrudate, said extrudate characterized by having:
   no more than 5% of its total pore volume in pores having a diameter greater than 350 Å;
   a total pore volume greater than 0.8 cc/g measured by mercury intrusion; and
   a bi-modal pore volume distribution having a primary and a secondary mode, wherein
      the primary mode exhibits a higher maximum than the secondary mode;
      the primary and secondary modes are separated by at least about 10 Å and by as much as about 200 Å;
      the primary pore mode occurs at a pore diameter greater than the median pore diameter ("MPD"), calculated either by volume ("$MPD_V$") or by surface area ("$MPD_{SA}$"); and
      the $MPD_V$ is larger than the $MPD_{SA}$;
   said process comprising:
   a) precipitating seed particles from an aqueous solution of reagents, wherein at least one such reagent comprises an aluminum compound, at a temperature of between about 25° C. and about 60° C., thereby producing a slurry;
   b) raising the temperature of the slurry to a temperature higher than in (a), but between about 50° C. and 90° C.;
   c) adding reagents to the slurry, thereby producing a slurry of particles;
   d) washing the slurry produced in (c) to remove substantially all remaining reagents;
   e) drying the washed slurry, thereby forming dried particles;
   f) forming the dried particles into support particles; and
   g) calcining the support particles, thereby producing said catalyst support.

2. The process of claim 1 wherein the catalyst support is characterized by the percentage of total pore volume in pores having a diameter greater than 350 Å being no more than 2.5%.

3. The process of claim 1 wherein the primary mode of the catalyst support occurs between about 100 Å and about 200 Å.

4. The process of claim 1 wherein the primary and secondary modes of the catalyst support are separated by between about 20 Å and about 80 Å.

5. The process of claim 1 wherein the seed particles are predominately alumina hydrate.

6. The process of claim 1 wherein the seed particles are converted to alumina hydrate prior to (c).

7. The process of claim 1 wherein the reagents are added in (c) at a rate so that the ratio of the rate of aluminum components in mols/hr of elemental aluminum contained therein to the mols of elemental aluminum contained in the seed particles is greater than about 5.5.

8. The process of claim 1 wherein (c) is performed in a vessel and there is no circulation of slurry outside of said vessel that returns to said vessel.

9. The process of claim 1 wherein the reagents are sodium aluminate and aluminum sulfate.

10. The process of claim 1 wherein (a) is conducted at a temperature between about 25° C. and about 50° C.

11. The process of claim 1 wherein (a) is conducted at an essentially constant temperature between about 25° C. and about 60° C.

12. The process of claim 1 wherein (a) is conducted at a pH of between about 3 and about 10.

13. The process of claim 1 wherein (a) is conducted at a pH selected from the group consisting of a) between about 3.0 and about 4.5 and b) between about 7.5 and about 10.0.

14. The process of claim 1 wherein (a) is conducted at a pH selected from the group consisting of a) between about 3.5 and about 4.0 and b) between about 8.5 and about 9.0.

15. The process of claim 1 wherein (a) and (c) are conducted in different vessels.

16. The process of claim 1 wherein (a) and (c) are conducted in the same vessel.

17. The process of claim 1 wherein (a) and (c) are performed as batch operations.

18. The process of claim 1 wherein (a) and (c) are performed as continuous operations.

19. The process of claim 1 wherein (a) is performed as a batch operation and (c) is performed as a continuous operation.

20. The process of claim 1 wherein (a) is performed as a continuous operation and (c) is performed as a batch operation.

21. The process of claim 1 wherein (c) is conducted at a temperature between about 50° C. and about 90° C.

22. The process of claim 1 wherein (c) is conducted at an essentially constant temperature between about 50° C. and about 90° C.

23. The process of claim 1 wherein (c) is conducted at a pH of between about 7 and about 11.

24. The process of claim 1 wherein (c) is conducted at a pH of between about 8.5 and about 9.5.

25. The process of claim 1 wherein the temperature is controlled in (a), (c) or both (a) and (c) by using a cooling or heating jacket.

26. The process of claim 1 wherein the temperature is controlled in (a), (c) or both (a) and (c) by adjusting the temperature of the reagents.

27. The process of claim 1 wherein the temperature is controlled in (a), (c) or both (a) and (c) by adding cold water.

28. The process of claim 1 wherein a) the reagents are sodium aluminate and aluminum sulfate;

b) washing the slurry is done by first raising the slurry's pH, if necessary, to above about 9 by adding a compound selected from the group consisting of sodium hydroxide and sodium aluminate and then rinsing it with water, thereby removing residual sulfate, and then lowering the slurry's pH to between about 7 and about 9.5 by adding nitric acid and then rinsing it with water, thereby removing residual sodium.

29. The process of claim 28 wherein the slurry's pH is lowered to between about 8.0 and 8.5 by adding nitric acid.

30. A catalyst support comprising the alumina made by the process of claim 1.

31. A catalyst made by a process comprising impregnating the catalyst support made by the process of claim 1 with a catalytically active amount of one or more catalytically active metal selected from the group consisting of metals, metallic oxides, metallic sulfides, and mixtures thereof.

* * * * *